(12) United States Patent
Kim

(10) Patent No.: US 11,458,838 B1
(45) Date of Patent: Oct. 4, 2022

(54) FOLDABLE PEDAL APPARATUS FOR VEHICLE

(71) Applicants: Hyundai Motor Company, Seoul (KR); Kia Corporation, Seoul (KR)

(72) Inventor: Eun Sik Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/387,502

(22) Filed: Jul. 28, 2021

(30) Foreign Application Priority Data

Apr. 1, 2021 (KR) .................. 10-2021-0042800

(51) Int. Cl.
  *G05G 1/30* (2008.04)
  *B60K 26/02* (2006.01)
  *B60T 7/04* (2006.01)
  *B60T 7/06* (2006.01)

(52) U.S. Cl.
  CPC .............. *B60K 26/02* (2013.01); *B60T 7/042* (2013.01); *B60T 7/06* (2013.01); *B60T 2220/04* (2013.01)

(58) Field of Classification Search
  CPC .. G05G 1/30; G05G 1/32; G05G 1/36; G05G 1/40; G05G 1/405; G05G 1/44; B60T 7/04; B60T 7/06; B60T 2220/04; B60K 26/02; B60K 2026/024; B60R 21/09
  See application file for complete search history.

(56) References Cited

U.S. PATENT DOCUMENTS

| | | | |
|---|---|---|---|
| 6,182,525 B1 * | 2/2001 | Bowers ................. | B60K 23/02 180/274 |
| 6,364,047 B1 * | 4/2002 | Bortolon ................ | B60K 23/02 74/513 |
| 8,770,616 B1 * | 7/2014 | Draper .................. | B60N 3/066 297/75 |
| 10,889,226 B1 * | 1/2021 | Dean ........................ | B60T 7/06 |
| 10,906,514 B1 * | 2/2021 | Kim ........................ | G05G 5/03 |
| 10,946,741 B1 * | 3/2021 | Kim ........................ | B60T 7/06 |
| 10,994,611 B1 * | 5/2021 | Kim ........................ | G05G 5/28 |
| 11,021,058 B1 * | 6/2021 | Kim ........................ | G05G 5/28 |
| 11,225,226 B1 * | 1/2022 | Kim ........................ | B60K 26/02 |
| 11,249,506 B1 * | 2/2022 | Kim ........................ | G05G 1/44 |

(Continued)

FOREIGN PATENT DOCUMENTS

KR  2017-0137427 A  12/2017
WO  WO-2021182563 A1 *  9/2021

OTHER PUBLICATIONS

Machine Translation of WO 2021/182563.*

*Primary Examiner* — Richard W Ridley
*Assistant Examiner* — Brian J McGovern
(74) *Attorney, Agent, or Firm* — Fox Rothschild LLP

(57) ABSTRACT

A foldable pedal apparatus for a vehicle includes a manual driving mode of the vehicle in which a driver drives a vehicle manually, and a pedal pad protrudes from a pedal casing and enters a pop-up state where the pedal pad is exposed toward the driver, and an autonomous driving mode of the vehicle in which the driver does not drive, and the pedal pad is retracted into the pedal casing and enters a hiding state where exposure of the pedal pad toward the driver is prevented. An interior design of the vehicle is optimized by allowing the pedal pad to pop up through a panel hole formed on a footrest panel when the pedal pad changes from the hiding state to the pop-up state.

20 Claims, 12 Drawing Sheets

(56) References Cited

U.S. PATENT DOCUMENTS

| | | | | |
|---|---|---|---|---|
| 11,312,236 B1* | 4/2022 | Kim | ................ | B60K 26/02 |
| 11,327,520 B1* | 5/2022 | Kim | ................ | G05G 5/05 |
| 2003/0094070 A1* | 5/2003 | O'Neill | ................ | G05G 1/36 |
| | | | | 74/560 |
| 2007/0137397 A1* | 6/2007 | Choi | ................ | G05G 1/36 |
| | | | | 74/512 |
| 2009/0223319 A1* | 9/2009 | Choi | ................ | G05G 1/36 |
| | | | | 74/512 |
| 2011/0132134 A1* | 6/2011 | Kim | ................ | F02D 11/02 |
| | | | | 74/514 |
| 2014/0316648 A1* | 10/2014 | Min | ................ | G05G 1/40 |
| | | | | 701/36 |
| 2015/0053038 A1* | 2/2015 | Kim | ................ | F16H 59/105 |
| | | | | 74/473.3 |
| 2015/0322835 A1* | 11/2015 | Ham | ................ | F01N 3/0814 |
| | | | | 701/29.2 |
| 2017/0225570 A1* | 8/2017 | El Aile | ................ | B60R 7/06 |
| 2019/0310678 A1* | 10/2019 | Wojciechowski | ....... | G05G 1/36 |
| 2020/0257329 A1* | 8/2020 | Kihara | ................ | G05G 1/60 |
| 2020/0262321 A1* | 8/2020 | Masu | ................ | B60N 2/20 |
| 2020/0317152 A1* | 10/2020 | Ghaffari | ................ | B60T 7/042 |
| 2020/0317166 A1* | 10/2020 | Ghaffari | ................ | B60K 26/02 |
| 2020/0317167 A1* | 10/2020 | Ghaffari | ................ | G05D 1/0061 |
| 2020/0398725 A1* | 12/2020 | Mullen | ................ | B60N 3/044 |
| 2021/0004040 A1* | 1/2021 | Dohmen | ................ | G05G 1/42 |
| 2021/0109560 A1* | 4/2021 | Ford | ................ | G05G 1/44 |
| 2021/0170988 A1* | 6/2021 | Villalva Sanchez | .... | B60R 21/09 |
| 2021/0197083 A1* | 7/2021 | Baumgartner | ........ | A63F 13/803 |
| 2021/0331584 A1* | 10/2021 | Kim | ................ | B60T 7/06 |
| 2021/0394798 A1* | 12/2021 | Kim | ................ | B60T 7/12 |
| 2022/0001843 A1* | 1/2022 | Michael | ................ | G05G 1/60 |
| 2022/0048384 A1* | 2/2022 | Kim | ................ | B60K 26/02 |
| 2022/0055477 A1* | 2/2022 | Kim | ................ | G05G 1/44 |
| 2022/0144222 A1* | 5/2022 | Kim | ................ | B60T 7/042 |
| 2022/0144223 A1* | 5/2022 | Kim | ................ | B60T 7/06 |

* cited by examiner

FOLDABLE PEDAL APPARATUS FOR VEHICLE

CROSS REFERENCE TO RELATED APPLICATION

The present application claims under 35 U.S.C. § 119(a) the benefit of Korean Patent Application No. 10-2021-0042800, filed on Apr. 1, 2021, the entire contents of which are incorporated by reference herein.

BACKGROUND

(a) Technical Field

The present disclosure relates generally to a foldable pedal apparatus for a vehicle, more particularly, to the foldable pedal apparatus for the vehicle having a manual driving mode in which a driver drives manually, a pedal pad protrudes toward the driver and is exposed to allow the driver to manipulate the pedal pad, and an autonomous driving mode, in which the pedal pad is hidden and prevented from being exposed toward the driver so as to prevent manipulation by the driver.

(b) Description of the Related Art

Recently, the development of autonomous driving vehicles is progressing in the direction of smart vehicles with autonomous driving technology enabling a vehicle to travel to a destination itself even when a driver does not manipulate a steering wheel, an accelerator pedal, and brakes.

When autonomous driving becomes universal, the driver can select a mode among a manual driving mode in which the driver drives manually and an autonomous driving mode in which the vehicle travels to a destination itself without direct involvement of the driver.

In the autonomous driving mode, the driver may rest while stretching his or her legs. Therefore, when a pedal (accelerator pedal and/or brake pedal) located in a lower space of a driver seat remains exposed to the vehicle interior, there is a problem in that the pedal may interfere with the driver.

An autonomous driving mode refers to a situation (i.e., a driving mode of the vehicle) in which the driver does not manipulate the pedal (accelerator pedal and/or brake pedal) of the vehicle. Therefore, when the driver manipulates the pedal during the autonomous driving, a vehicle controller determines that the driver stops the autonomous driving and wants to resume manual driving, and thereby stops the autonomous driving.

However, since the pedal of the vehicle is configured to be exposed to the lower space of the driver seat, in the autonomous driving mode, there is a risk that the driver inadvertently manipulates the pedal (mis-operation of pedal), and in this case, there is a risk that an accident may occur in response to a traffic condition or a distance between vehicles.

Accordingly, it would be desirable to develop a pedal apparatus having a manual driving mode in which the driver drives manually, the pedal pad is exposed to protrude toward the driver so that manipulation by the driver is possible, and an autonomous driving mode in which exposure of a pedal pad is prevented so that manipulation by the driver is avoided in order to provide safety to vehicle occupants and allow the driver to rest, while preventing inadvertent operation of the pedal.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a foldable pedal apparatus for a vehicle, in which the vehicle has a manual driving mode in which a driver drives manually, a pedal pad protrudes toward the driver and is exposed toward the driver (pop-up state) so that manipulation by the driver may be performed, and an autonomous driving mode, in which the pedal pad is hidden to prevent exposure of the pedal pad toward the driver (hiding state) so that the manipulation by the driver may not be performed, whereby the driver can rest in the autonomous driving mode and safety may be ensured by preventing inadvertent operation of the pedal in the autonomous driving mode.

Another objective of the present disclosure is intended to provide a foldable pedal apparatus, in which a hole of a footrest panel through which a pedal pad passes during pop-up operation or hiding operation of the pedal pad is formed to have a relatively small size, whereby vehicle interior design may be optimized, and the pedal pad pops up through the small-sized hole formed on the footrest panel in the manual driving mode, so the high-tech image of the foldable pedal apparatus may be achieved.

In order to achieve the above objective, a foldable pedal apparatus for a vehicle includes: a pedal casing coupled to a footrest panel located at a lower space of a driver seat and configured to protrude forward; a pedal frame configured to be movable in a sliding manner in forward and rearward directions of the pedal casing while passing through the footrest panel, the pedal frame being configured such that, when the pedal frame moves forward, the pedal frame may be retracted into the pedal casing, and when the pedal frame moves rearward, the pedal frame may protrude from the pedal casing and be exposed to vehicle interior; a pedal pad rotatably coupled to the pedal frame and configured to be manipulated by a driver; a spring module rotatably coupled, at opposite ends thereof, to the pedal frame and the pedal pad, and configured to provide elastic force to the pedal pad so that the pedal pad may swing in a direction of protruding from the pedal frame; and a rotary motor securely provided at the pedal casing and configured to generate power for sliding movement of the pedal frame.

When the pedal frame moves forward by operation of the rotary motor, both the pedal frame and the pedal pad may be retracted into the pedal casing and the pedal pad may be folded toward the pedal frame and thereby enter a hiding state in which exposure of the pedal pad toward the driver may be prevented.

When the pedal frame moves rearward by operation of the rotary motor, both the pedal frame and the pedal pad may protrude from the pedal casing and the pedal pad may swing by the elastic force of the spring module to be unfolded against the pedal frame and thereby enter a pop-up state in which the pedal pad may be exposed toward the driver.

The foldable pedal apparatus may include: a protection cover rotatably coupled to the footrest panel and configured to open and close a panel hole; and a cover spring coupled to the footrest panel and the protection cover to be supported at opposite ends thereof and configured to provide elastic force to the protection cover so that the protection cover may swing in a direction of sealing the panel hole, wherein the pedal frame may be configured to move in the forward and rearward directions through the panel hole.

The foldable pedal apparatus may include: a pinion gear coupled to the rotary motor; and a rack gear coupled to the pedal frame to be extended in a longitudinal direction of the pedal frame and engaged with the pinion gear.

The foldable pedal apparatus may include: a support roller located in and rotatably coupled to the pedal casing and configured to be in contact with a lower surface of the pedal frame.

The foldable pedal apparatus may include: an upper guide and a lower guide provided in the pedal casing and configured to prevent vertical movement of the pedal frame by being in contact with an upper surface and a lower surface of the pedal frame.

The foldable pedal apparatus may include: side guides provided in the pedal casing and configured to prevent lateral movement of the pedal frame by being in contact with left and right side surfaces of the pedal frame.

The pedal frame may have a frame hole extended in a longitudinal direction of the pedal frame and passing through the pedal frame vertically; and when the pedal frame is retracted in the pedal casing, the spring module may be retracted into the frame hole, and when the pedal frame is in a protruding state from the pedal casing, the spring module may protrude from the frame hole.

Foreign materials are configured to be discharged through the frame hole.

The pedal pad may be an organ-type pad, which may be rotatably coupled, at a lower end thereof, to a rear end of the pedal frame with a hinge pin as a medium, be connected to the spring module at a position above the hinge pin, and have an upper end swinging forward and rearward on the hinge pin.

The spring module may include: a lower spring guide rotatably coupled, at a front end thereof, to the pedal frame with a first connection pin as a medium, and having a rear end protruding toward the pedal pad, and having a hollow cylindrical structure; an upper spring guide rotatably coupled, at a rear end thereof, to the pedal pad with a second connection pin as a medium, and having a front end retracted into the lower spring guide, and thereby moving along the lower spring guide; and a first spring and a second spring provided such that opposite ends of each of the first and second springs may be supported by the lower spring guide and the upper spring guide.

The lower spring guide may include a hidden protrusion configured to protrude upward; and when the pedal frame retracted in the pedal casing moves rearward and thereby protrudes from the pedal casing, the hidden protrusion may be exposed to the vehicle interior while passing through the footrest panel, so that the spring module may be restored to elongate by restoration of the first spring and the second spring and the pedal pad may swing on the hinge pin to be unfolded against the pedal frame and thereby enter a pop-up state in which the pedal pad may be exposed toward the driver.

The lower spring guide may include a hidden protrusion configured to protrude upward; and when the pedal frame protruding from the pedal casing moves forward and thereby is retracted into the pedal casing and allows the hidden protrusion to be brought into contact with the footrest panel, the lower spring guide may swing toward the pedal frame to allow the first spring and the second spring to be compressed so that the spring module may be shortened, the pedal pad may swing on the hinge pin in a direction in which the pedal pad may be folded to the pedal frame, the pedal frame may be fully retracted into the pedal casing together with the pedal pad to allow the spring module to be retracted into the frame hole formed in the pedal frame, and the pedal pad may enter a folded state to the pedal frame, and thereby enter a hiding state in which exposure of the pedal pad toward the driver may be prevented.

The pedal frame may have a depression-shaped retraction groove at an upper surface of a rear end thereof; and the rear end of the upper spring guide may be retracted into the retraction groove in response to swing of the spring module.

A protrusion may be provided by protruding upward from a rear end of the pedal frame; and when the pedal pad swings to be unfolded against the pedal frame and thereby enters a pop-up state in which the pedal pad is exposed toward the driver, a lower end of the pedal pad may be brought into contact with the protrusion to restrain swing thereof, whereby an initial position of the pedal pad in the pop-up state may be locked.

The foldable pedal apparatus may include: a permanent magnet coupled to the hinge pin of the pedal pad; and a printed circuit board (PCB) securely provided at the pedal frame to face the permanent magnet; wherein the PCB may be configured to detect a swing angle of the pedal pad by magnetic flux change of the permanent magnet during rotation of the hinge pin in response to the swing of the pedal pad to generate a signal related to a pedal function.

When the pedal pad swings to enter a hiding state or a pop-up state by forward and rearward movements of the pedal frame in response to operation of the rotary motor and a position of the permanent magnet changes, the PCB may not generate the signal related to the pedal function in order to prevent inadvertent operation (mis-operation) of the pedal pad.

The PCB may be configured such that in a situation where the pedal frame moves rearward to protrude from the pedal casing, the pedal pad may be unfolded against the pedal frame to be in a pop-up state, and the rotary motor may not be operated, and only when the pedal pad and the hinge pin rotate by manipulation of the driver to allow a position of the permanent magnet to change, the PCB may generate the signal related to the pedal function only.

The foldable pedal apparatus may be used as an accelerator pedal apparatus or a brake pedal apparatus.

As described above, the foldable pedal apparatus according to the present disclosure is configured such that, in a manual driving mode of the vehicle in which the driver drives manually, the pedal frame and the pedal pad protrude from the pedal casing and pop up to be exposed toward the driver, so that manipulation of the pedal pad by the driver can be performed, and in the autonomous driving mode where the driver does not drive, the pedal frame and the pedal pad are retracted into the pedal casing and enter the hiding state to prevent exposure of the pedal pad toward the driver, so that manipulation of the pedal pad by the driver cannot be performed. Accordingly, there are advantages that the driver may rest when the vehicle is in the autonomous driving mode, and safety may be improved because mis-operation of the pedal is prevented in the autonomous driving mode.

The foldable pedal apparatus according to the present disclosure is configured such that, during the hiding state, the pedal pad is retracted into the pedal casing to fully hide and, in particular, the panel hole of the footrest panel through which the pedal pad passes during the pop-up and hiding states of the pedal pad is minimized (i.e., relatively small in size). Accordingly, there is an advantage that the vehicle interior design can be optimized.

The foldable pedal apparatus according to the present disclosure is configured such that, the pedal pad protrudes from the pedal casing during change from the hiding state to the pop-up state and, in particular, the pedal pad pops up through the small-sized panel hole formed on the footrest panel. Accordingly, there is an advantage that the high-tech image of the foldable pedal apparatus can be achieved.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Figure 1:
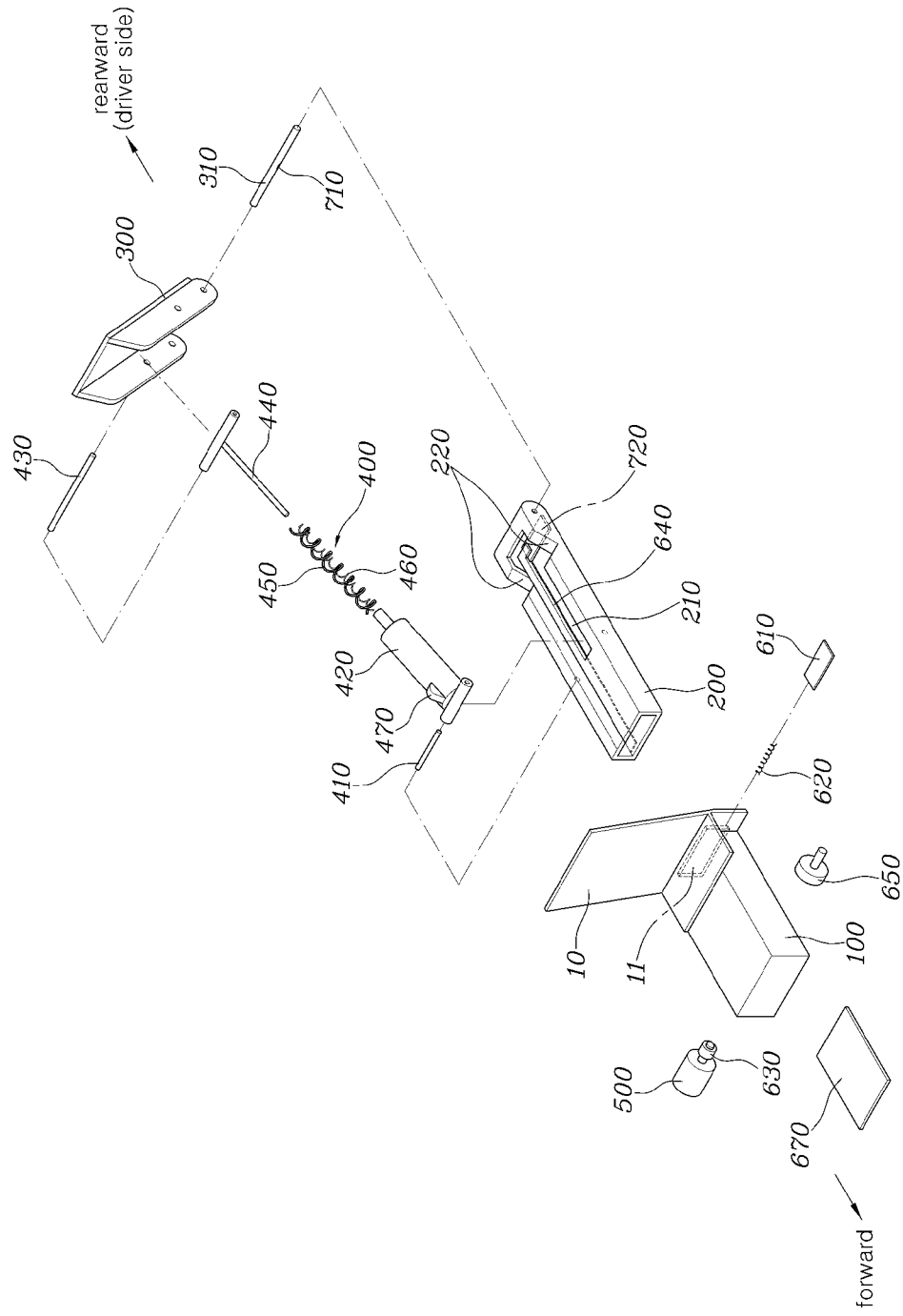
FIG. 1 is a disassembled-perspective view showing a foldable pedal apparatus for a vehicle according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all of modifications, equivalents, and substitutions are included in the scope and spirit of the disclosure.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing particular embodiments only and is not intended to limit the present disclosure. Singular forms are intended to include plural forms unless the context clearly indicates otherwise.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

A control part (controller) according to the exemplary embodiment of the present disclosure may be realized by a nonvolatile memory (not shown), which consists of an algorithm configured to control operations of various components of a vehicle or data regarding software instructions to play the algorithm, and a processor (not shown), which is configured to perform operations described below using the data stored in the memory. Here, the memory and processor may be realized as separate chips. Alternately, the memory and processor may be realized as an integrated single chip. The processor may take one or more form.

Hereinbelow, a foldable pedal apparatus for a vehicle according to exemplary embodiments of the present disclosure will be described with reference to accompanying drawings.

According to the present disclosure, as shown in FIGS. 1 to 12, the foldable pedal apparatus includes: a pedal casing 100 coupled to a footrest panel 10 located at a lower space of a driver seat and configured to protrude forward; a pedal frame 200 configured to be movable in a sliding manner in forward and rearward directions thereof while passing through the footrest panel 10, and when the pedal frame moves forward, the pedal frame is retracted into the pedal casing 100, and when the pedal frame moves rearward, the pedal frame protrudes from the pedal casing 100 and is exposed to a vehicle interior; a pedal pad 300 rotatably coupled to the pedal frame 200 and configured to be manipulated by a foot of a driver; a spring module 400 rotatably coupled, at opposite ends thereof, to the pedal frame 200 and the pedal pad 300, and configured to provide elastic force to the pedal pad 300 so that the pedal pad 300 swings in a direction of protruding from the pedal frame 200; and a rotary motor 500 securely provided at the pedal casing 100 and configured to generate power for sliding movement of the pedal frame 200.

The footrest panel 10 may be replaced with a console.

In the foldable pedal apparatus according to the present disclosure, when the pedal frame 200 moves forward due to operation of the rotary motor 500, both the pedal frame 200 and the pedal pad 300 are retracted into the pedal casing 100, and the pedal pad 300 is folded toward the pedal frame 200 and thereby enters a hiding state in which the pedal pad is prevent from being exposed toward the driver (see FIGS. 2-4 and 9)

In the foldable pedal apparatus according to the present disclosure, when the pedal frame 200 moves rearward due to operation of the rotary motor 500, both the pedal frame 200 and the pedal pad 300 protrude from the pedal casing 100, and the pedal pad 300 swings by the elastic force of the spring module 400 to be folded against the pedal frame 200 by a predetermined angle and thereby maintains a pop-up state in which the pedal pad is exposed toward the driver (see FIGS. 5-8 and 12).

According to the present disclosure, the footrest panel 10 has a panel hole 11, and the panel hole 11 communicates with the inside of the pedal casing 100 coupled to the footrest panel 10.

According to an embodiment of the present disclosure, the foldable pedal apparatus includes: a protection cover 610 rotatably coupled to the footrest panel 10 and configured to open and close the panel hole 11; and a cover spring 620 coupled to the footrest panel 10 and the protection cover 610 to be supported at opposite ends thereof, and configured to provide elastic force to the protection cover 610 so that the protection cover 610 swings in a direction of sealing the panel hole 11. The pedal frame 200 is configured to move in the forward and rearward directions through the panel hole 11.

When the pedal frame 200 and the pedal pad 300 moves forward through the panel hole 11 and are retracted into the pedal casing 100, that is, the pedal pad 300 enters the hiding state in which the pedal pad is retracted in the pedal casing 100, the panel hole 11 of the footrest panel 10 is sealed by the protection cover 610.

On the other hand, when the pedal frame 200 and the pedal pad 300 retracted in the pedal casing 100 move rearward and protrude from the pedal casing 100, the pedal frame 200 pushes and rotates the protection cover 610 to allow the panel hole 11 of the footrest panel 10 to be opened, and the pedal frame 200 and the pedal pad 300 are exposed toward the driver through the opened panel hole 11.

According to the present disclosure, a pinion gear 630 is coupled to the rotary motor 500, and a rack gear 640 is coupled to the pedal frame 200 to be extended in a longitudinal direction of the pedal frame. The pinion gear 630 and the rack gear 640 are configured to be engaged with each other.

Therefore, during operation of the rotary motor 500, the pedal frame 200 performs sliding movement in the forward and rearward directions by the pinion gear 630 and the rack gear 640.

The present disclosure includes a support roller 650 located in and rotatably coupled to the pedal casing 100 and configured to be in contact with a lower surface of the pedal frame 200.

The rotary motor 500 and the support roller 650 are provided at first and second sides of the pedal casing 100 to face each other.

According to the embodiment of the present disclosure, the foldable pedal apparatus includes: an upper guide 660 and a lower guide 670 provided in the pedal casing 100 and configured to prevent vertical movement of the pedal frame 200 by being in contact with upper and lower surfaces of the pedal frame 200; and side guides 680 provided in the pedal casing 100 and configured to prevent lateral movement of the pedal frame by being in contact with left and right surfaces of the pedal frame 200.

The upper guide 660 is formed in an upper protrusion protruding downward from an inner upper surface of the pedal casing 100 and is extended in a longitudinal direction of the pedal casing 100, the upper guide 660 consists of two upper protrusions spaced apart from each other in a lateral direction of the pedal casing 100, and the upper guide 660 is in contact with the upper surface of the pedal frame 200.

The lower guide 670 is formed in a flat plate, is fixed to the pedal casing 100 to be located in the pedal casing 100, is located to be spaced forward from the rotary motor 500 and the support roller 650, and is in contact with the lower surface of the pedal frame 200.

The side guides 680 are provided at the inner left and right surfaces of the pedal casing 100, and is in contact with the left and right surfaces of the pedal frame 200.

The pedal frame 200 has a frame hole 210 extended in the longitudinal direction of the pedal frame and passing through the pedal frame vertically. When the pedal frame 200 is retracted into the pedal casing 100, the spring module 400 is retracted into the frame hole 210, and when the pedal frame 200 protrudes from the pedal casing 100, the spring module 400 protrudes from the frame hole 210.

As the spring module 400 is configured to be retracted into the frame hole 210, there is an advantage that a compact structure of the foldable pedal apparatus may be realized during the hiding state of the pedal pad 300.

In order to realize the structure in which the spring module 400 is retracted into the frame hole 210 during the hiding state of the pedal pad 300, the pedal frame 200 has a depression-shaped retraction groove 220 at an upper surface of a rear end of the pedal frame, and the retraction groove 220 is configured such that a rear end of an upper spring guide 440, which will be described below, is retracted into the retraction groove in response to the swing of the spring module 400.

Furthermore, foreign material may be discharged through the frame hole 210, whereby to there is an advantage in that mis-operation of the pedal frame 200 and/or the pedal pad 300 caused by stuck foreign materials may be prevented.

The pedal pad 300 preferably is an organ-type pad, which is rotatably coupled, at a lower end thereof, to the rear end of the pedal frame 200 with a hinge pin 310 as a medium, is connected to the spring module 400 at a position above the hinge pin 310, and has an upper end swinging forward and rearward on the hinge pin 310.

The spring module 400 includes: a lower spring guide 420 rotatably coupled, at a front end thereof, to the pedal frame 200 with a first connection pin 410 as a medium, having a rear end protruding toward the pedal pad 300, and having a hollow cylindrical structure; the upper spring guide 440 rotatably coupled, at a rear end thereof, to the pedal pad with a second connection pin 430 as a medium, and having a front end retracted into the lower spring guide 420, and thereby moving along the lower spring guide 420; and a first spring 450 and a second spring 460 provided such that opposite ends of each of the first and second springs are supported by the lower spring guide 420 and the upper spring guide 440.

The front end of the lower spring guide 420 is located at a front portion of the frame hole 210 formed in the pedal frame 200 to be retracted therein, and the first connection pin 410 is coupled to the pedal frame 200 and the front end of the lower spring guide 420 by simultaneously passing through the pedal frame 200 and the front end of the lower spring guide 420 in a lateral direction of the pedal frame.

The spring module 400 may tune pedal effort by tuning spring force of each of the first spring 450 and the second spring 460. In particular, in order to suppress fine vibration of the pedal pad 300, the first spring 450 and the second spring 460 are preferably configured to have different spring force from each other.

The first spring 450 and the second spring 460 are compression coil springs.

Preferably, the rotary motor 500 is a rotary step motor configured to rotate during operation thereof and to lock rotation of the motor when the operation stops, is configured to be electrically connected to a power supply, and is controlled in movement thereof by a printed circuit board (PCB), which will be described below.

According to the present disclosure, the lower spring guide 420 has a hidden protrusion 470 configured to protrude upward.

When the pedal frame 200 retracted in the pedal casing 100 moves rearward by the operation of the rotary motor 500 and thereby performs protruding movement from the pedal casing 100, the hidden protrusion 470 is exposed to the vehicle interior while passing through the footrest panel 10. Accordingly, the spring module 400 is restored to elongate by restoration of the first spring 450 and the second spring 460 and the pedal pad 300 swings on the hinge pin 310 to be unfolded against the pedal frame 200 and thereby enters the pop-up state in which the pedal frame is exposed toward the driver (referring to a process shown in FIGS. 9 to 12)

On the other hand, when the pedal frame 200 protruding from the pedal casing 100 moves forward by the operation of the rotary motor 500 and thereby is retracted into the pedal casing 100 and allows the hidden protrusion 470 to be brought into contact with the footrest panel 10, the lower spring guide 420 swings toward the pedal frame 200 to allow the first spring 450 and the second spring 460 to be compressed so that the spring module 400 is shortened. The pedal pad 300 swings on the hinge pin 310 in a direction in which the pedal pad is folded to the pedal frame 200, the pedal frame 200 is fully retracted into the pedal casing 100 together with the pedal pad 300 to allow the spring module 400 to be retracted into the frame hole 210 formed in the pedal frame 200, and the pedal pad 300 is folded to the pedal frame 200, and thereby enters the hiding state in which exposure of the pedal pad to the driver is prevented (referring to a process shown in FIGS. 12 to 9).

In the foldable pedal apparatus according to the present disclosure, a protrusion 230 is configured to protrude upward from the rear end of the pedal frame 200. When the pedal pad 300 swings to be unfolded against the pedal frame 200 to be in the pop-up state in which the pedal pad is exposed to the driver, the lower end of the pedal pad 300 is brought into contact with the protrusion 230 so as to restrain swing thereof, whereby an initial position of the pedal pad 300 in the pop-up state is locked by the protrusion 230 (referring to FIG. 7).

The foldable pedal apparatus of the present disclosure includes a permanent magnet 710 coupled to the hinge pin 310 of the pedal pad 300 and the PCB 720 securely provided at the pedal frame 200 to face the permanent magnet 710.

The PCB 720 has a function of controlling the operation of the rotary motor 500.

Furthermore, the PCB 720 may have a function of detecting swing of the pedal pad 300 when the driver manipulates the pedal pad 300 by pedaling.

When the hinge pin 310 rotates in response to swing of the pedal pad 300, the PCB 720 detects a swing angle of the pedal pad 300 by magnetic flux change of the permanent magnet 710 to generate a signal related to the pedal function, and the signal related to the pedal function is a signal related to brake or a signal related to acceleration.

The foldable pedal apparatus according to the present disclosure is used as one of the accelerator pedal apparatus and the brake pedal apparatus in the autonomous driving vehicle, or is used as both the accelerator pedal apparatus and the brake pedal apparatus.

Figure 2:
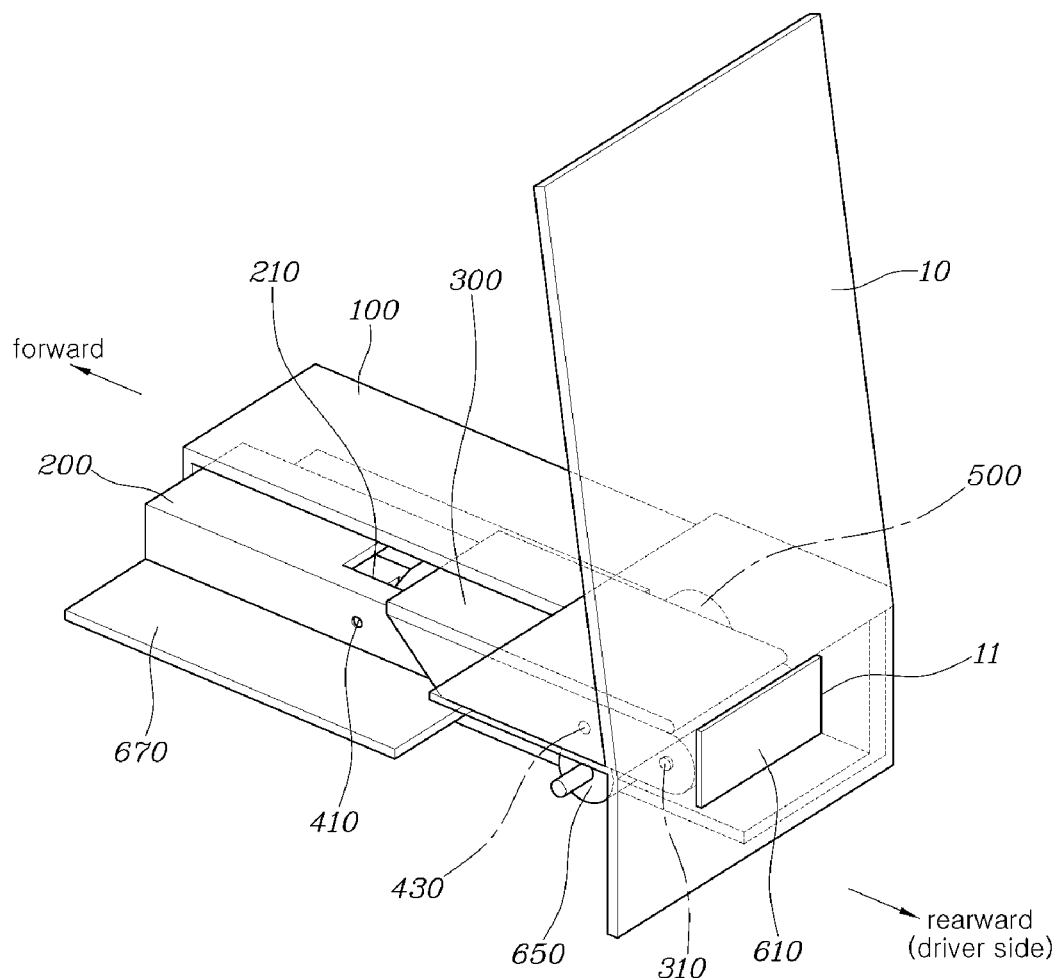
FIG. 2 is an assembled-perspective view showing the foldable pedal apparatus of FIG. 1, wherein the foldable pedal apparatus is in a hiding state in which a pedal frame and a pedal pad are retracted in a pedal casing.
Figure 3:
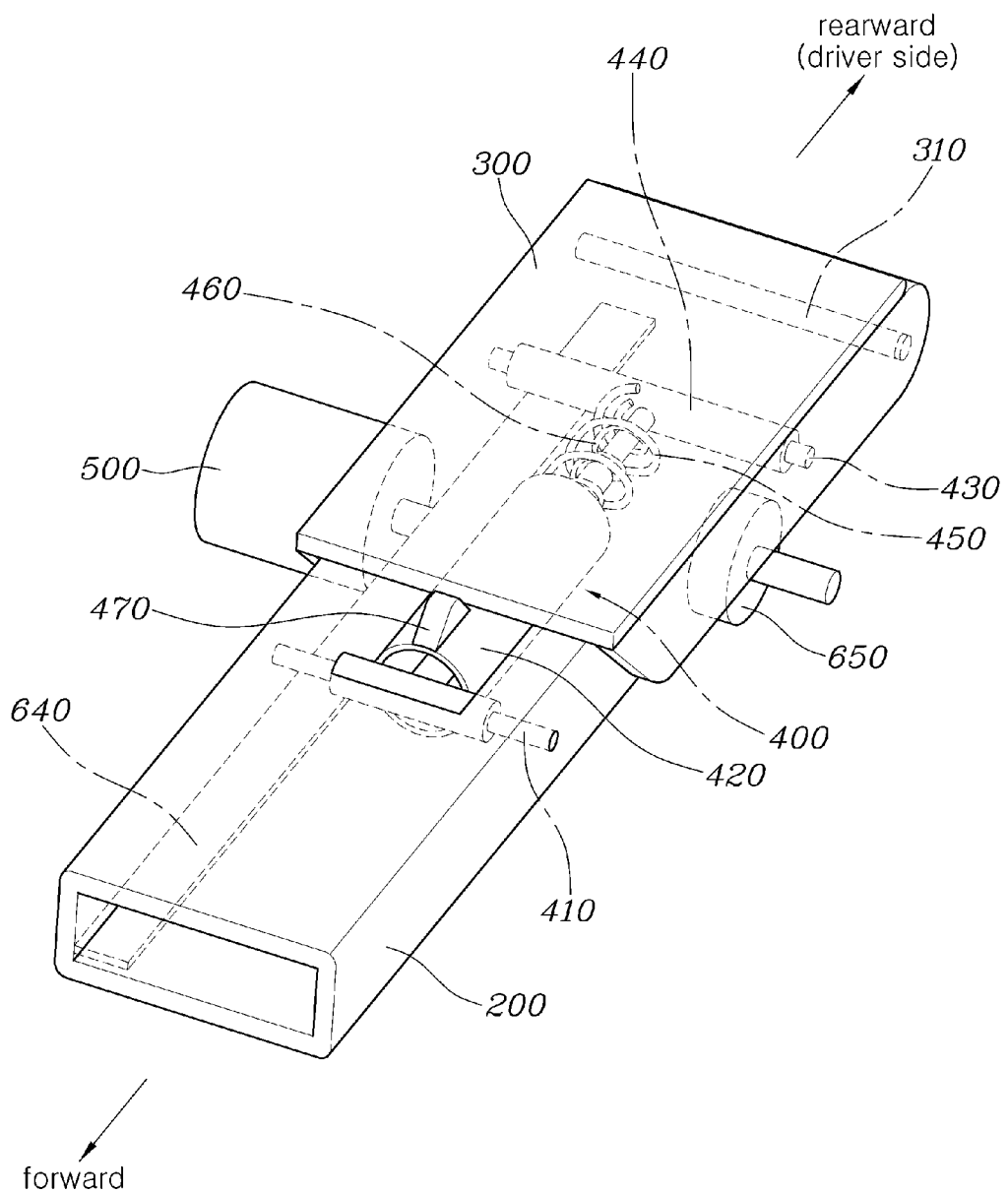
FIG. 3 is a view showing the foldable pedal apparatus, wherein a footrest panel and the pedal casing are removed in the state of FIG. 2.
Figure 4:
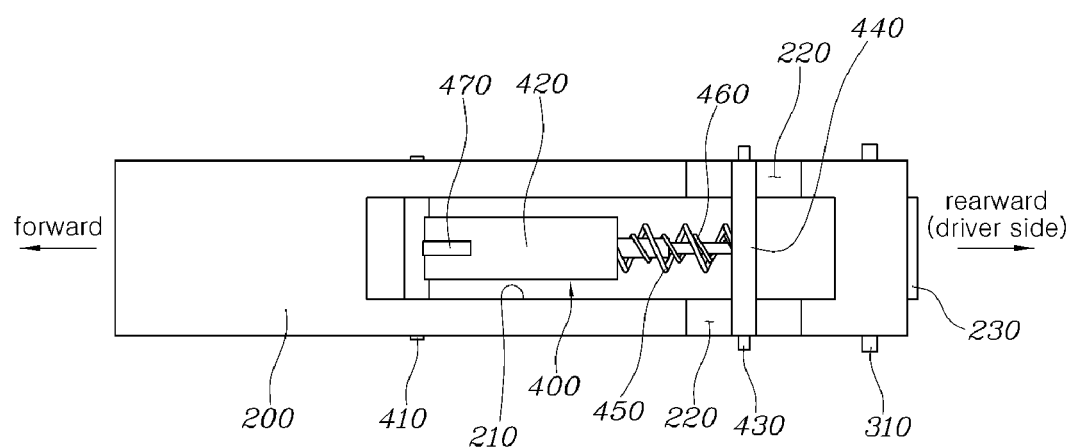
FIG. 4 is a plan view showing a state in which a spring module is retracted in a frame hole formed in the pedal frame in FIG. 3.
Figure 9:
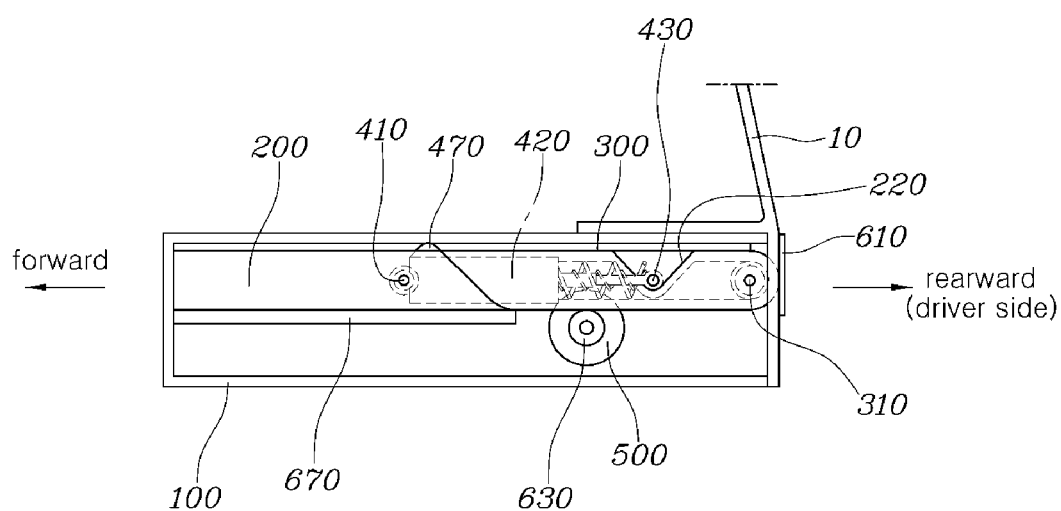
FIGS. 9 to 12 are views showing movement process in which the pedal pad changes from the hiding state to the pop-up state according to the present disclosure.

FIGS. 2 and 9 show the foldable pedal apparatus in the hiding state. In the drawings, the pedal frame 200 and the pedal pad 300 move forward by the operation of the rotary motor 500 and are retracted into the pedal casing 100, and the pedal pad 300 swings to be folded to the pedal frame 200, so that the pedal is prevented from being exposed toward the driver.

As the spring module 400 is configured to be retracted into the frame hole 210 formed in the pedal frame 200 during the hiding state, there is an advantage that the compact structure of the foldable pedal apparatus may be realized during the hiding state of the pedal pad 300.

During the hiding state of the pedal pad 300, the pedal frame 200 and the pedal pad 300 enter the hiding state in which the pedal frame 200 and the pedal pad 300 securely hide in the pedal to casing 100 consisting of a small space and the panel hole 11 of the footrest panel 10 is sealed by the protection cover 610. Accordingly, there is an advantage that a vehicle interior design may be optimized.

The foldable pedal apparatus according to the present disclosure is configured to form the panel hole 11 on the footrest panel 10 to be minimized (i.e., relatively small), wherein the pedal pad 300 passes through the panel hole during the pop-up state and the hiding state of the pedal pad 300, so that the vehicle interior design may be optimized.

As described above, when the pedal pad 300 is in the hiding state, the lower space of the driver seat becomes widened so as not to interfere with the pedal, and the driver may rest. Furthermore, mis-operation of the pedal in the autonomous driving mode is prevented and safety may be improved.

The pedal pad 300 is configured to be retracted into the pedal casing 100 in the hiding state so as to enter the fully hiding state. Accordingly, there is an advantage that excellent vehicle interior design may be secured.

Figure 10:
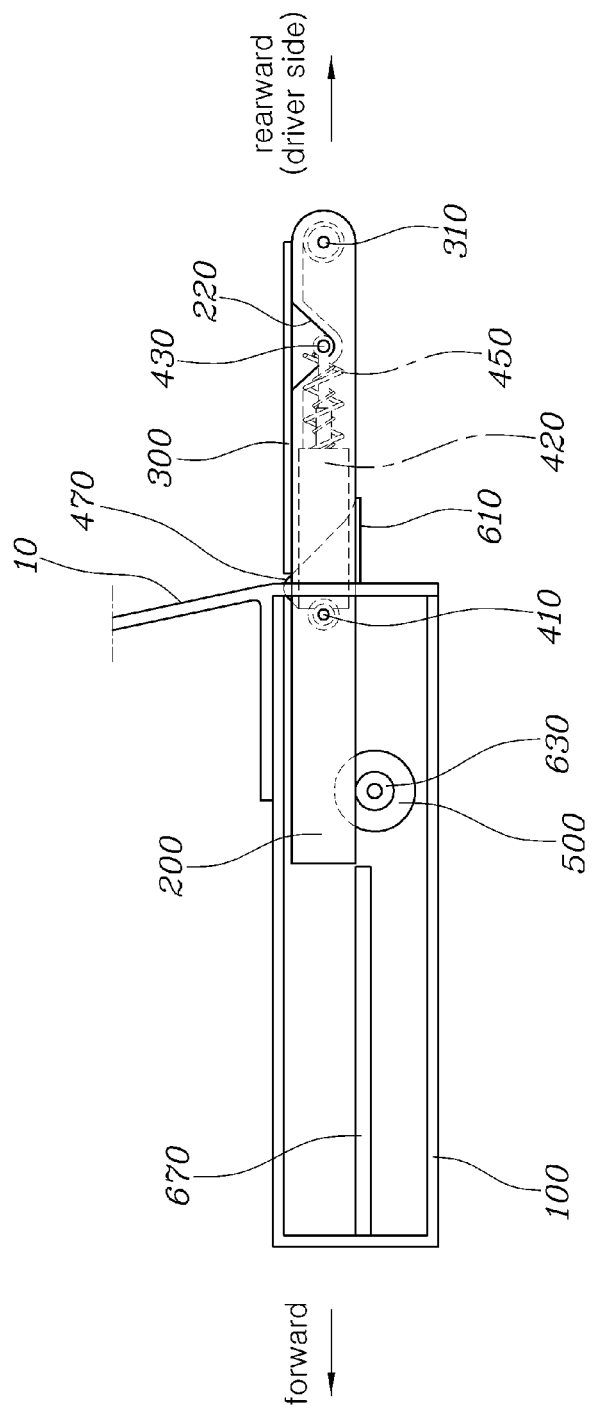

The pedal frame 200 and the pedal pad 300 in the hiding state as shown in FIG. 9 move rearward by operation of the rotary motor 500 as shown in FIG. 10 and enters a protruding state from the pedal casing 100, and the pedal pad 300 maintains the folded state to the pedal frame 200 until the hidden protrusion 470 fully passes through the footrest panel 10.

Figure 11:
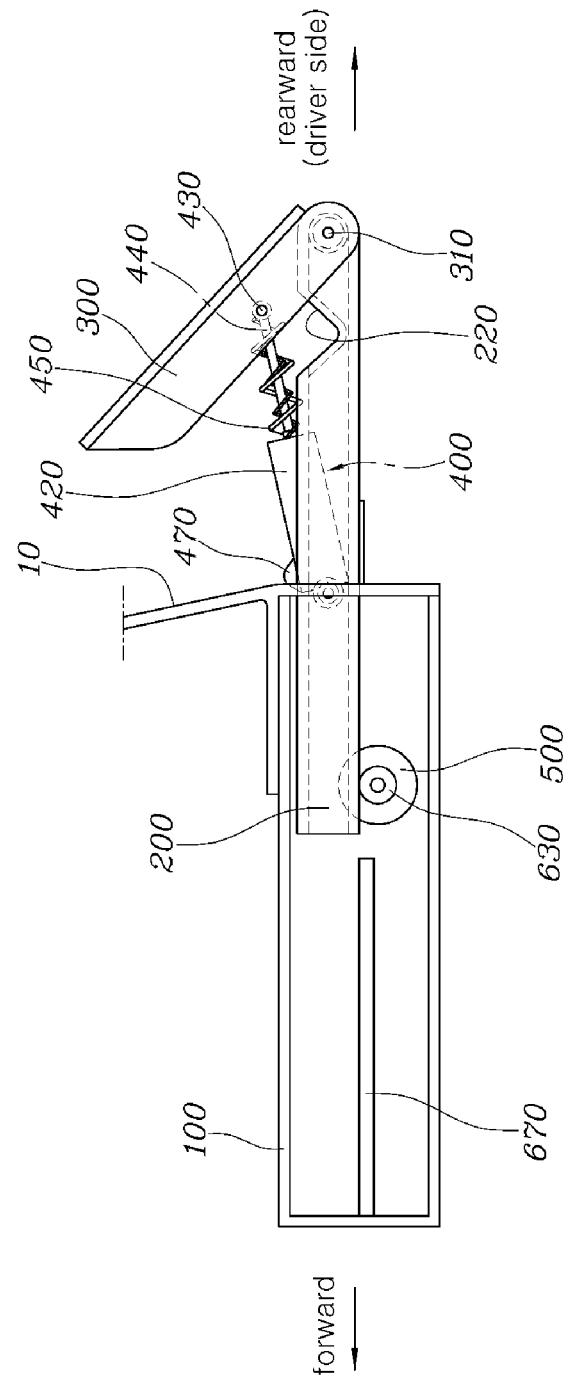

FIG. 11 is a view in which the pedal frame 200 has further moved rearward from the state in FIG. 10, and at this time, the hidden protrusion 470 passes through the footrest panel 10.

When the hidden protrusion 470 passes through the footrest panel 10 and is exposed to the vehicle interior, the spring module 400 is restored to elongate by the restoration of the first spring 450 and the second spring 460, and the pedal pad 300 starts rotation on the hinge pin 310 so as to be unfolded against the pedal frame 200.

Figure 5:
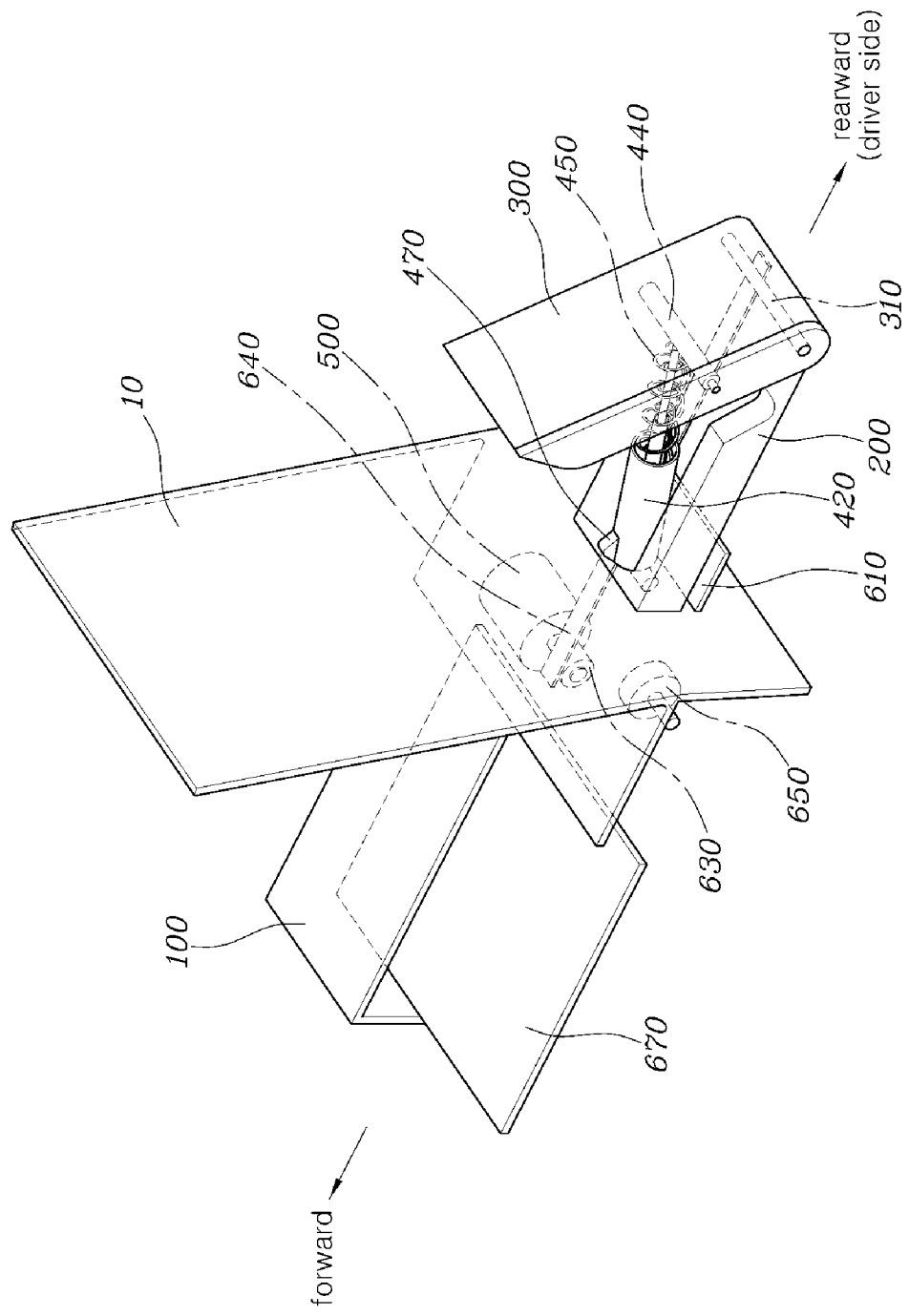
FIG. 5 is a view showing a pop-up state in which, according to the present disclosure, the pedal frame and the pedal pad protrude from the pedal casing and the pedal pad swings to be unfolded against the pedal frame.
Figure 6:
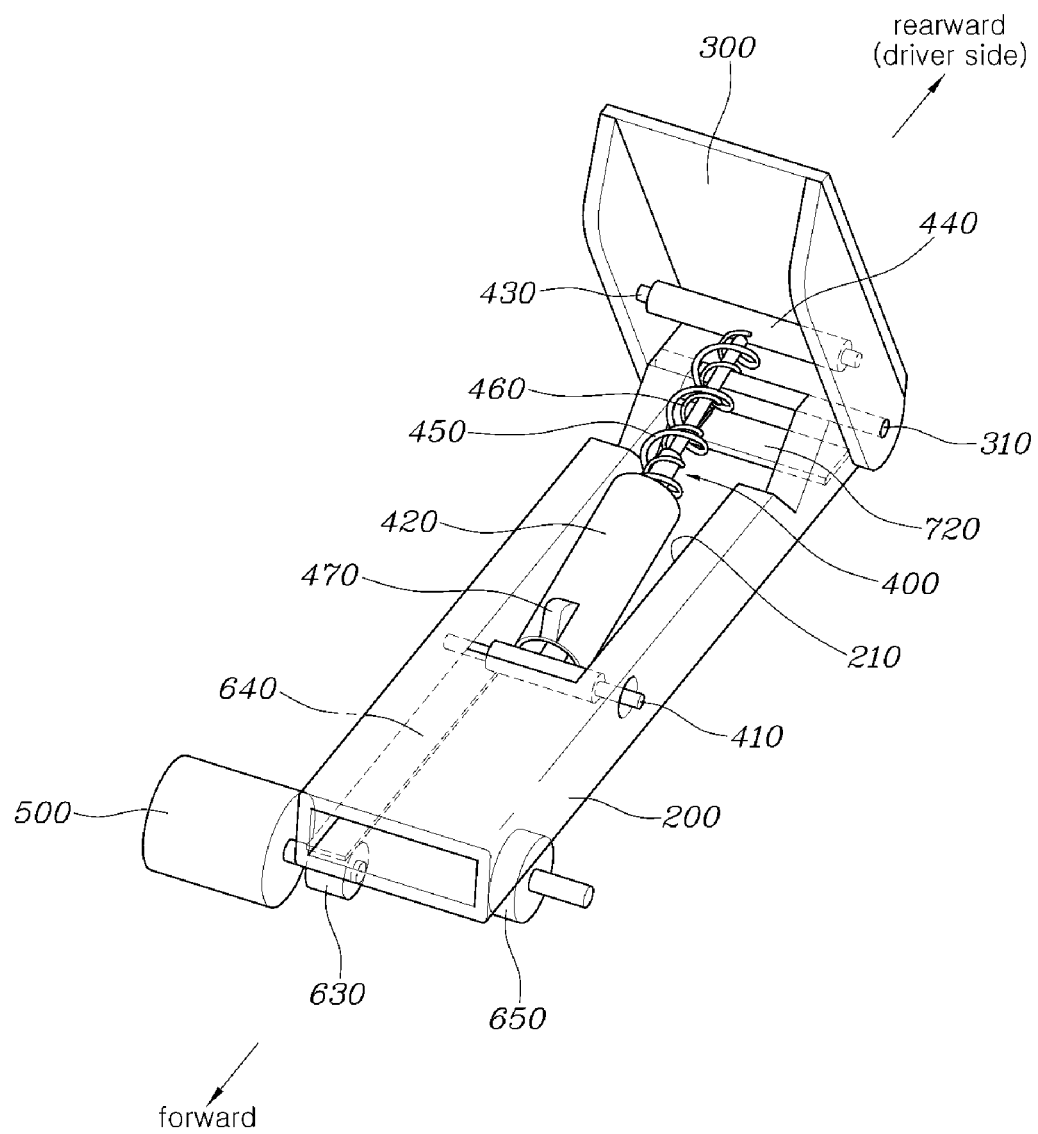
FIG. 6 is a view showing a state in which the footrest panel and the pedal casing are removed from the state of FIG. 5.
Figure 7:
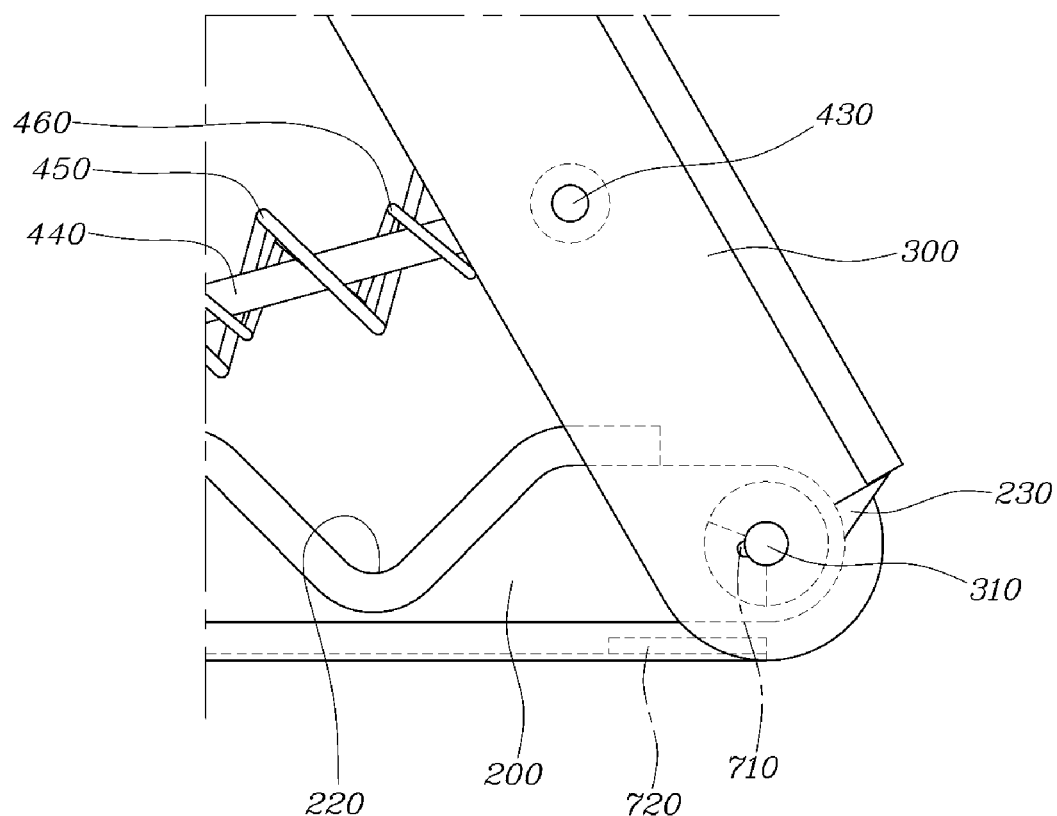
FIG. 7 is an enlarged side view showing a portion to which the hinge pin is coupled in FIG. 6.
Figure 8:
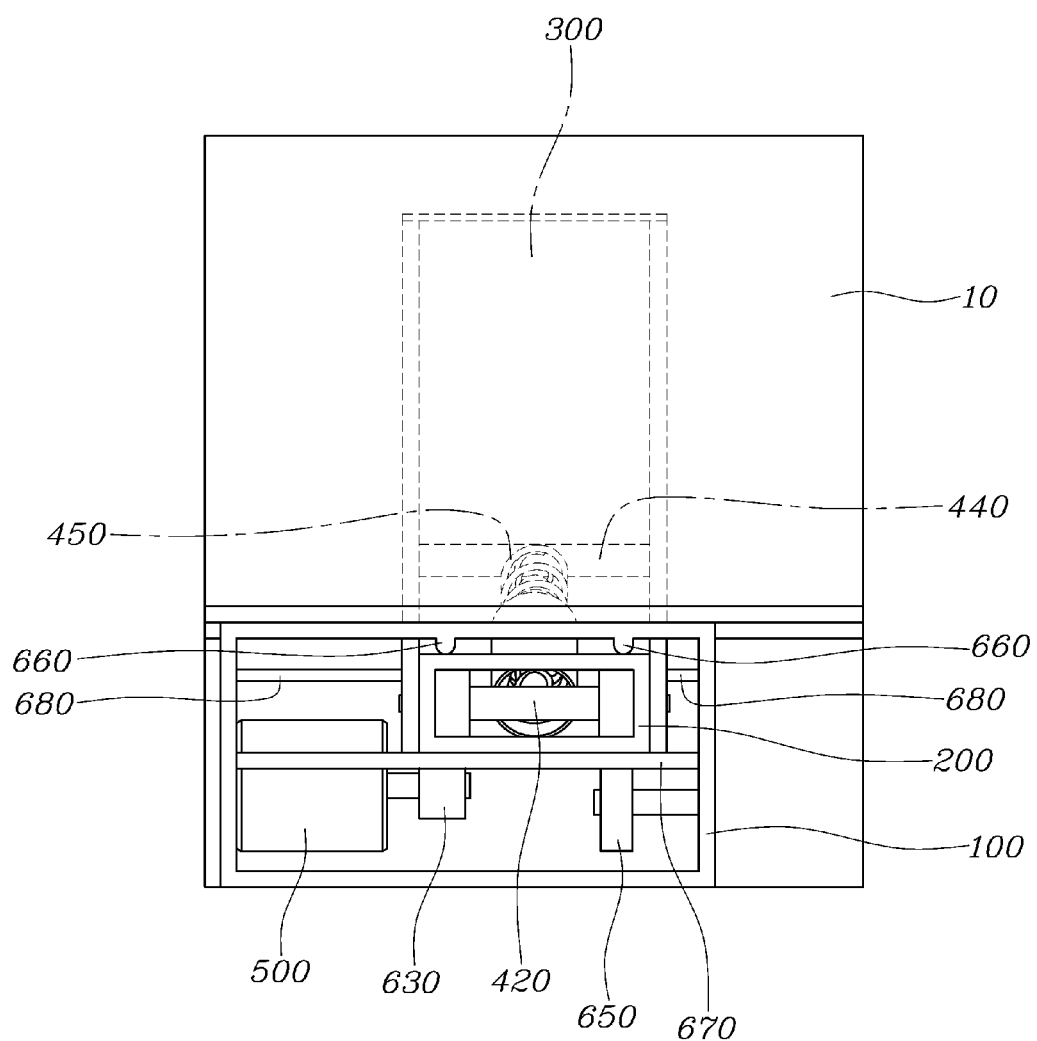
FIG. 8 is a view showing the inside of the pedal frame by being taken from the front, the present disclosure, and showing an upper guide, a lower guide, and a side guide.
Figure 12:
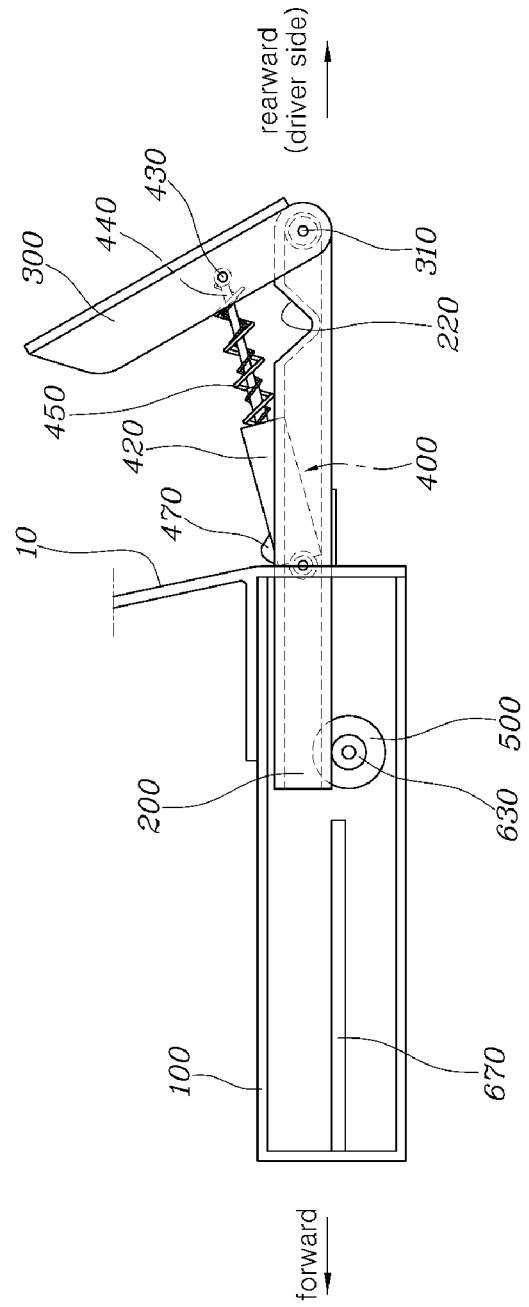

FIGS. 5 and 12 show a state in which the pedal frame 200 further moves rearward in the state of FIG. 11 and maximally protrude from the pedal casing 100. At this time, the pedal pad 300 is in the pop-up state in which the pedal pad swings on the hinge pin 310 by the spring force of the spring module 400 to be fully unfolded against the pedal frame 200 and be exposed toward the driver.

As described above, when the pedal pad 300 is in the pop-up state, the spring module 400 is located in a diagonal direction and supports the pedal pad 300.

When the pedal pad 300 changes from the hiding state in which the pedal pad hides in the pedal casing 100 as shown in FIG. 9 to the pop-up state in which the pedal pad protrudes toward the driver as shown in FIG. 12, the pedal pad 300 protrudes from the pedal casing 100 and, in particular, the pedal pad pops up through the small-sized panel hole 11 formed on the footrest panel 10. Accordingly, there is an advantage that the high-tech image of the foldable pedal apparatus may be achieved.

When the pedal pad 300 swings to be unfolded against the pedal frame 200 and thereby enters the pop-up state, the driver manipulates the protruding pedal pad 300 by foot.

During the normal manipulation of the pedal pad 300, the pedal effort may be realized by change in the length of the spring module 400, and the movement of the pedal pad 300 may be restrained by restraining force of the rotary motor 500.

When the pedal pad 300 swings by the manipulation of the driver, the hinge pin 310 rotates together with the pedal pad 300, the permanent magnet 710 rotates together with the hinge pin 310, and the PCB 720 detects the swing angle of the pedal pad 300 by the magnetic flux change of the permanent magnet 710 rotating together with the pedal pad 300 during the swing of the pedal pad 300 and generates the signal related to the pedal function (signal related to acceleration or signal related to brake).

According to the embodiment of the present disclosure, when the pedal pad 300 swings to enter the hiding state or the pop-up state by the forward and rearward movement of the pedal frame 200 in response to the operation of the rotary motor 500 so as to change a position of the permanent magnet 710, the PCB 720 does not generate the signal related to the pedal function (signal related to acceleration or signal related to brake) in order to prevent mis-operation of the foldable pedal apparatus.

That is, when the pedal frame 200 moves forward by the operation of the rotary motor 500 and is retracted into the pedal casing 100 and the pedal pad 300 enters the hiding state as shown in FIG. 9, or when the pedal frame 200 moves rearward by the operation of the rotary motor 500 and protrudes from the pedal casing 100 and the pedal pad 300 swings and is unfolded against the pedal frame 200 to enter the pop-up state, the PCB 720 does not generate the signal related to the pedal function even when the position of the permanent magnet 710 changes, so that an accident caused by mis-operation may be prevented.

However, as shown in FIG. 12 in which the pedal frame 200 has moved rearward to fully protrude from the pedal casing 100, the pedal pad 300 is unfolded against the pedal frame 200 to be in the pop-up state, and the rotary motor 500 is not operated, even when the permanent magnet 710 rotates to change a position thereof as the pedal pad 300 and the hinge pin 310 rotate by the manipulation of the driver. The PCB 720 generates the signal related to the pedal function, so more safe operation of the foldable pedal apparatus may be induced.

As described above, the foldable pedal apparatus according to the present disclosure is configured such that, when the vehicle is in a manual driving mode in which the driver drives manually, the pedal frame 200 and the pedal pad 300 protrude from the pedal casing 100 and pop up to be exposed toward the driver, so that manipulation of the pedal pad 300 by the driver may be performed, and when the vehicle is in the autonomous driving mode, the driver does not drive, the pedal frame 200 and the pedal pad 300 are retracted into the pedal casing 100 and enter the hiding to state to prevent exposure of the pedal pad toward the driver, thus preventing manipulation of the pedal pad 300 by the driver. Accordingly, there are advantages that the driver may rest in the autonomous driving mode and safety may be improved because mis-operation of the pedal is prevented in the autonomous driving mode.

The foldable pedal apparatus according to the present disclosure is configured such that, during the hiding state, the pedal pad 300 is retracted into the pedal casing 100 to be fully hidden, where the panel hole 11 of the footrest panel 10 through which the pedal pad 300 passes during the pop-up and hiding states of the pedal pad 300 is formed as small as possible. Accordingly, there is an advantage that the vehicle interior design may be optimized.

The foldable pedal apparatus according to the present disclosure is configured such that, the pedal pad 300 protrudes from the pedal casing 100 during a change from the hiding state to the pop-up state, where the pedal pad 300 pops up through the small-sized panel hole 11 formed on the footrest panel 10. Accordingly, there is an advantage that the high-tech image of the foldable pedal apparatus may be achieved.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A foldable pedal apparatus for a vehicle, the foldable pedal apparatus comprising:
   a pedal casing coupled to a footrest panel located at a lower space of a driver seat and configured to protrude forward;
   a pedal frame configured to be movable in a sliding manner in forward and rearward directions of the pedal casing while passing through the footrest panel, the pedal frame being configured such that, when the pedal frame moves forward, the pedal frame is retracted into the pedal casing, and when the pedal frame moves rearward, the pedal frame protrudes from the pedal casing and is exposed to a vehicle interior;
   a pedal pad rotatably coupled to the pedal frame and configured to be manipulated by a driver;
   a spring module rotatably coupled, at opposite ends thereof, to the pedal frame and the pedal pad, and configured to provide elastic force to the pedal pad so that the pedal pad swings in a direction of protruding from the pedal frame; and
   a rotary motor securely provided at the pedal casing and configured to generate power for sliding movement of the pedal frame.

2. The foldable pedal apparatus of claim 1, wherein when the pedal frame moves forward by operation of the rotary motor, both the pedal frame and the pedal pad are retracted into the pedal casing and the pedal pad is folded toward the pedal frame and thereby enters a hiding state in which exposure of the pedal pad toward the driver is prevented.

3. The foldable pedal apparatus of claim 1, wherein when the pedal frame moves rearward by operation of the rotary motor, both the pedal frame and the pedal pad protrude from the pedal casing and the pedal pad swings by the elastic force of the spring module to be unfolded against the pedal frame and thereby enters a pop-up state in which the pedal pad is exposed toward the driver.

4. The foldable pedal apparatus of claim 1, further comprising:
   a protection cover rotatably coupled to the footrest panel and configured to open and close a panel hole; and
   a cover spring coupled to the footrest panel and the protection cover to be supported at opposite ends thereof and configured to provide elastic force to the protection cover so that the protection cover swings in a direction of sealing the panel hole,
   wherein the pedal frame is configured to move in the forward and rearward directions through the panel hole.

5. The foldable pedal apparatus of claim 1, further comprising:
   a pinion gear coupled to the rotary motor; and
   a rack gear coupled to the pedal frame to be extended in a longitudinal direction of the pedal frame and engaged with the pinion gear.

6. The foldable pedal apparatus of claim 1, further comprising:
   a support roller located in and rotatably coupled to the pedal casing and configured to be in contact with a lower surface of the pedal frame.

7. The foldable pedal apparatus of claim 1, further comprising:
   an upper guide and a lower guide provided in the pedal casing and configured to prevent vertical movement of the pedal frame by being in contact with an upper surface and a lower surface of the pedal frame.

8. The foldable pedal apparatus of claim 1, further comprising:
   side guides provided in the pedal casing and configured to prevent lateral movement of the pedal frame by being in contact with left and right side surfaces of the pedal frame.

9. The foldable pedal apparatus of claim 1, wherein the pedal frame has a frame hole extended in a longitudinal direction of the pedal frame and passing through the pedal frame vertically; and
   when the pedal frame is retracted in the pedal casing the spring module is retracted into the frame hole, and when the pedal frame is in a protruding state from the pedal casing, the spring module protrudes from the frame hole.

10. The foldable pedal apparatus of claim 9, wherein the frame hole is configured to discharge foreign materials therethrough.

11. The foldable pedal apparatus of claim 1, wherein the pedal pad is pad an organ pad, which is rotatably coupled, at a lower end thereof, to a rear end of the pedal frame with a hinge pin as a medium, is connected to the spring module at a position above the hinge pin, and has an upper end swinging forward and rearward on the hinge pin.

12. The foldable pedal apparatus of claim 11, further comprising:
   a permanent magnet coupled to the hinge pin of the pedal pad; and
   a printed circuit board (PCB) securely provided at the pedal frame to face the permanent magnet;
   wherein the PCB is configured to detect a swing angle of the pedal pad by magnetic flux change of the permanent magnet during rotation of the hinge pin in response to the swing of the pedal pad to generate a signal related to a pedal function.

13. The foldable pedal apparatus of claim 12, wherein when the pedal pad swings to enter a hiding state or a pop-up state by forward and rearward movements of the pedal frame in response to operation of the rotary motor and a position of the permanent magnet changes, the PCB does not generate the signal related to the pedal function in order to prevent mis-operation of the pedal pad.

14. The foldable pedal apparatus of claim 12, wherein the PCB is configured such that in a situation where the pedal frame moves rearward to protrude from the pedal casing, the pedal pad is unfolded against the pedal frame to be in a pop-up state, and the rotary motor is not operated, and only when the pedal pad and the hinge pin rotate by manipulation of the driver to allow a position of the permanent magnet to change, the PCB generates the signal related to the pedal function only.

15. The foldable pedal apparatus of claim 1, wherein the spring module comprises:
    a lower spring guide rotatably coupled, at a front end thereof, to the pedal frame with a first connection pin as a medium, and having a rear end protruding toward the pedal pad, and having a hollow cylindrical structure;
    an upper spring guide rotatably coupled, at a rear end thereof, to the pedal pad with a second connection pin as a medium, and having a front end retracted into the lower spring guide, and thereby moving along the lower spring guide; and
    a first spring and a second spring provided such that opposite ends of each of the first and second springs are supported by the lower spring guide and the upper spring guide.

16. The foldable pedal apparatus of claim 15, wherein the lower spring guide comprises a hidden protrusion configured to protrude upward; and
    when the pedal frame retracted in the pedal casing moves rearward and thereby protrudes from the pedal casing the hidden protrusion is exposed to the vehicle interior while passing through the footrest panel, so that the spring module is restored to elongate by restoration of the first spring and the second spring and the pedal pad swings on the hinge pin to be unfolded against the pedal frame and thereby enters a pop-up state in which the pedal pad is exposed toward the driver.

17. The foldable pedal apparatus of claim 15, wherein the lower spring guide comprises a hidden protrusion configured to protrude upward; and
    when the pedal frame protruding from the pedal casing moves forward and thereby is retracted into the pedal casing and allows the hidden protrusion to be brought into contact with the footrest panel, the lower spring guide swings toward the pedal frame to allow the first spring and the second spring to be compressed so that the spring module is shortened, the pedal pad swings on the hinge pin in a direction in which the pedal pad is folded to the pedal frame, the pedal frame is fully retracted into the pedal casing together with the pedal pad to allow the spring module to be retracted into the frame hole formed in the pedal frame, and the pedal pad enters a folded state to the pedal frame, and thereby enters a hiding state in which exposure of the pedal pad toward the driver is prevented.

18. The foldable pedal apparatus of claim 15, wherein the pedal frame has a depression-shaped retraction groove at an upper surface of a rear end thereof; and
    the rear end of the upper spring guide is retracted into the retraction groove in response to swing of the spring module.

19. The foldable pedal apparatus of claim 1, wherein a protrusion is provided by protruding upward from a rear end of the pedal frame; and
    when the pedal pad swings to be unfolded against the pedal frame and thereby enters a pop-up state in which the pedal pad is exposed toward the driver, a lower end of the pedal pad is brought into contact with the protrusion to restrain swing thereof, whereby an initial position of the pedal pad in the pop-up state is locked.

20. The foldable pedal apparatus of claim 1, wherein the foldable pedal apparatus is used as an accelerator pedal apparatus or a brake pedal apparatus.

\* \* \* \* \*